Patented June 2, 1942

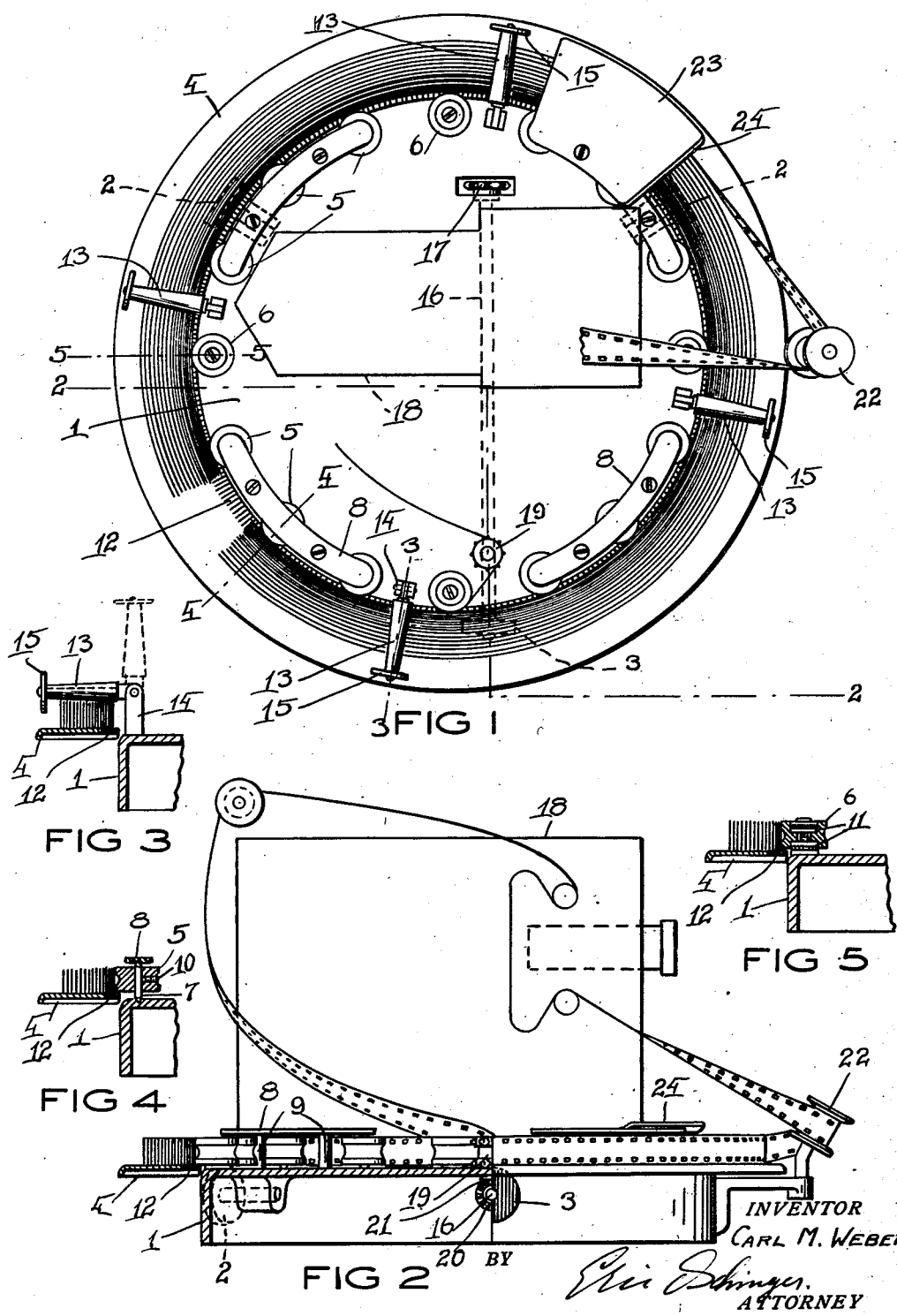

2,285,070

UNITED STATES PATENT OFFICE 2,285,070

REWIND MECHANISM

Carl M. Weber, Rochester, N. Y.

Application February 19, 1940, Serial No. 319,669

3 Claims. (Cl. 88—18.7)

This invention relates to rewinding means for endless motion picture film used for the purpose of continually feeding such film to and from a projector and cause a motion picture to be automatically shown over and over again, and the principal object of this invention is to provide a novel rewind mechanism in which the endless film is supported in a coil form on a horizontally supported turn table which is frictionally driven in such a manner that the film will be fed to and from the projector without causing any strain on the film or friction between the film layers.

Another object of this invention is to provide a rewind mechanism with a flexibly driven turntable support for the film coil.

A further object of this invention is to provide a rewind mechanism in which the film is fed from a large diameter film coil in order to keep the number of layers in the film coil at a minimum and provide a minimum difference in the linear speed of the layers of the film coil.

Still another object of this invention is to provide a rewind mechanism for endless motion picture film in which the film coil support and film feeding mechanism is adapted to surround the motion picture projector so as to have the combined projector and rewind mechanism occupy a minimum space.

All these and other objects and attendant advantages of the invention will become more readily apparent from the detailed description thereof which follows, reference being had to the accompanying drawing in which Figure 1 is a top plan view of the rewind mechanism with a portion of the film coil broken away.

Figure 2 is a partial section and side elevation taken on the line 2—2 of Figure 1.

Figure 3 is a detail sectional view taken on the line 3—3 of Figure 1.

Figure 4 is a detail sectional view taken on the line 4—4 of Figure 1.

Figure 5 is a detail sectional view taken on the line 5—5 of Figure 1.

The rewind mechanism forming the subject matter of my present invention comprises the base 1, on the outside of which are mounted to rotate a pair of idly rotating supporting rollers 2, and a driven roller 3. These rollers are suitably arranged to horizontally support the ring shaped platform 4 around the outside of the base 1 at the top thereof. On top of the base, concentrically arranged at the edge thereof, are pivotally mounted two series of vertically positioned guide rollers 5, 5 and 6, 6 all of which slightly overhang the inner edge of the turn table or platform 4 to permit a free floating, rotating movement of the platform around these guide rollers. As illustrated in Figure 4 the guide rollers 5, 5 are grouped in series of three and are each mounted on a stem 7 which is pivoted to rotatably support its roller between the base and a strap 8 spacedly mounted on the base by the bolts 9, 9. Each roller 5 is adjustable on its pivot stem by means of a setscrew 10.

As illustrated in Figure 5 the guide rollers 6, 6 are pivotally supported between a pair of ball bearings 11, 11 one at the top and the other at the bottom of the roller. The ball bearings at the bottom of the roller serve to limit the laterally floating movement of the platform 4 to keep it rotating substantially concentric around the rollers 5, 5 and 6, 6.

The top surface of the inner edge of the platform is knurled as indicated at 12 in the figures in order to prevent slippage of the inner layer or layers of the film coil which is supported on the platform. A series of slightly tapered, idle rollers 13, 13 are held to rest on top of the film roll supported on the platform so as to exert pressure on the inner layer or layers of the film coil and hold their bottom edges against the serrated surface of the platform for positive movement therewith. Each of the idle rollers is mounted to swing on a standard 14 so that it may be swung away from the coil and permit its removal and exchange for another film coil. A washer or flange 15 on the outside of each roller 13 keeps the film coil from sliding off the platform 4 and holds it thereon.

As above described the roller 3, which in conjunction with the rollers 2, 2 support the platform 4, is positively driven. For this purpose it is carried by the drive shaft 16 which is suitably journaled in the base and is driven by the sprocket 17 from the driving mechanism of the projector which is also supported on the base 1 and occupies in outline the space indicated by the dotted line 18. The weight of the platform with that of the film coil supported thereon against the roller 3 thus provides a frictional contact between the roller and the platform which causes the roller to flexibly drive the platform and feed the film from the inside of the film coil to the film sprocket 19. The latter is positively driven from the drive shaft 16 by means of suitable bevel or spiral gears 20 and 21 and continues to feed the film to the projector in synchronism therewith.

After passing through the projector the film is fed onto the angularly arranged, freely rotating guide roller 22 which guides the film back to the film coil on the outside thereof. A guide plate 23 with its upturned edge 24 guides the film back down onto the platform 4 for rotation with the film coil.

From the foregoing it will be apparent that film from the film coil supported on the turn table 4 will have its inner layer or layers driven with the turn table at a speed which corresponds to the peripheral speed of the film sprocket 19. The film after passing through the projector is fed onto the outside of the film coil where the film speed is higher because of the greater diameter of the outer layers of the coil. The higher peripheral speed causes the layers on the outside of the coil to be loose and this avoids friction between them. However as the layers work toward the inside of the coil their diameter is reduced gradually and to avoid a tightening between the layers of the coil that will cause friction between them or put a strain on the film the platform is only frictionally driven to provide a positive but flexible drive by the action of the weight of the platform with its coil on the driving roller 3. Only the inner layer or layers of the film are held to positively move with the turn table so that, as above pointed out, all other layers of larger diameter are free to adjust themselves on the turn table to gradually decrease in diameter without a tightening and resultant friction between the layers.

I claim:

1. A rewind mechanism for endless motion picture film comprising a circular stationary base adapted for the support of a projection apparatus, supporting rollers rotatably mounted on the outside of said base, a ring shaped turn table supported on said rollers for normally rotative movement and slightly lateral adjusting movement relative to said base, one of said rollers being positively driven for movement of said turn table on said rollers, a film feeding sprocket for positively feeding the film from the inside of said turn table relative to the rotation of the inner edge of said turn table, guide rollers concentrically arranged on the outer edge of said base and held supported above said turn table for sole contact with the inside of the film roll above its support on said turn table and film guide means for guiding the film from the inside to the outside of said turn table to permit the film to gradually adjust itself to the rotative speed of the inner edge of the turn table in its winding movement of the film by the turn table from the outside to the inside thereof.

2. A rewind mechanism for endless motion picture film comprising a circular stationary base adapted for the support of a projection apparatus, supporting rollers rotatably mounted on the outside of said base, a ring shaped turn table supported on said rollers for normally rotative movement and slightly lateral adjusting movement on said rollers, one of said rollers being positively driven for movement of said turn table, and guide rollers concentrically arranged on the outer edge of said base so as to overhang the inner edge of said turn table for sole contact with the inside of the film roll supported on the turn table and guidance of the turn table thru the film roll.

3. A rewind mechanism for endless motion picture film comprising a circular stationary base adapted for the support of a projection apparatus, supporting rollers rotatably mounted on the outside of said base, a ring shaped turn table supported on said rollers for normally rotative movement and slightly lateral adjusting movement relative to said base, one of said rollers being positively driven for movement of said turn table on said rollers, guide rollers concentrically arranged on the outer edge of said base and held supported above said turn table for sole contact with the inside of the film roll above its support on said turn table, and friction means on the inner edge of said turn table for engagement by the bottom edge of the inner layers of the film roll supported on the turn table for positive movement therewith.

CARL M. WEBER.